(12) United States Patent
Chu et al.

(10) Patent No.: US 11,059,568 B2
(45) Date of Patent: Jul. 13, 2021

(54) VARIABLE OPERATOR INTERFACE FOR BACKDRIVING CONTROL INPUT DEVICES

(71) Applicant: The Boeing Company, Chicago, IL (US)

(72) Inventors: Bryan C. Chu, Phoenix, AZ (US); Joseph G. Irwin, Landenberg, PA (US); Russell Enns, Chandler, AZ (US); Gary D. Klein, Mesa, AZ (US); Jon F. Lenander, Queen Creek, AZ (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 16/298,480

(22) Filed: Mar. 11, 2019

(65) Prior Publication Data
US 2020/0290728 A1  Sep. 17, 2020

(51) Int. Cl.
| | |
|---|---|
| *B64C 13/08* | (2006.01) |
| *G05D 1/08* | (2006.01) |
| *B64C 13/16* | (2006.01) |
| *B64C 13/50* | (2006.01) |

(52) U.S. Cl.
CPC ............ *B64C 13/08* (2013.01); *B64C 13/16* (2013.01); *B64C 13/503* (2013.01); *G05D 1/0816* (2013.01)

(58) Field of Classification Search
CPC ......... B64C 13/08; B64C 13/50; B64C 13/16; B64C 13/0816; B64C 13/503; G05D 1/08
See application file for complete search history.

(56) References Cited

U.S. PATENT DOCUMENTS

| | | |
|---|---|---|
| 4,078,749 A | 3/1978 | Johnson, Jr. |
| 6,189,836 B1 | 2/2001 | Gold et al. |
| 2003/0106958 A1 | 6/2003 | Gold et al. |
| 2005/0004721 A1* | 1/2005 | Einthoven ............ G05D 1/0858 701/4 |

(Continued)

OTHER PUBLICATIONS

Nabil Aouf et al., "Scheduling schemes for an integrated flight and propulsion control system", Control Engineering Practive 10 (2002) 685-696, Department of Electrical and Computer Engineering, McGill University, Montreal, Canada.

(Continued)

*Primary Examiner* — Tan Q Nguyen

(57) ABSTRACT

A control system having a variable operator interface (VOI) is disclosed, and includes one or more processors and a memory coupled to the processors. The memory stores program code causing the control system to detect an existence and first direction of an operator control input to one or more active inceptors being backdriven from an operator on inceptor detector (OID). The control system is caused to compare the first direction of the operator control input with a second direction of one or more zero-force detent rates to determine a variance and interprets the operator control input as inadvertent based on the variance. In response to interpreting the operator control input as inadvertent, the control system is caused to limit the operator control input to reduce or substantially eliminate movement of the machine caused by inadvertent input by modifying the operator control input based on one or more command modifiers.

20 Claims, 6 Drawing Sheets

(56) References Cited

U.S. PATENT DOCUMENTS

| | | | |
|---|---|---|---|
| 2009/0234518 A1* | 9/2009 | Irwin, III | B64C 13/345 |
| | | | 701/4 |
| 2009/0242691 A1 | 10/2009 | Wittmer | |
| 2009/0266940 A1 | 10/2009 | Miller et al. | |
| 2011/0168851 A1 | 7/2011 | Cherepinsky | |
| 2012/0053763 A1* | 3/2012 | Stiefenhofer | B64C 13/507 |
| | | | 701/3 |
| 2013/0060406 A1 | 3/2013 | Christensen et al. | |
| 2013/0099064 A1* | 4/2013 | Cherepinsky | B64C 13/503 |
| | | | 244/223 |
| 2014/0231591 A1 | 8/2014 | Higuchi et al. | |
| 2015/0307203 A1* | 10/2015 | Litwinowicz | B64D 45/00 |
| | | | 701/14 |
| 2019/0155282 A1 | 5/2019 | Kim | |

OTHER PUBLICATIONS

Non-Final Rejection, U.S. Appl. No. 16/298,468, dated Jun. 17, 2020.
Notice of Allowance, U.S. Appl. No. 16/298,468, dated Oct. 5, 2020.

* cited by examiner

VARIABLE OPERATOR INTERFACE FOR BACKDRIVING CONTROL INPUT DEVICES

INTRODUCTION

The present disclosure relates to a control system for a machine having a variable operator interface (VOI). More particularly, the disclosure relates to a control system for reducing or substantially eliminating movement of a machine, where the movement of the machine is caused by inadvertent operator input due to the control input device being backdriven.

BACKGROUND

Some machines or mechanical apparatuses are equipped with control systems requiring human input to manage operation of moving components. For example, a trajectory of a vehicle is managed by operation of a variety of control input devices, which are referred to as inceptors, that are manipulated by a human operator. The inceptors may be actively driven to provide force based tactile cues to the human operator and provide backdrive capability, and may be referred to as active inceptors. Backdriving an inceptor provides a machine operator with an indication as to what the control system is doing to the machine and provides control inputs to maintain a particular machine state. In one example, inceptor that is backdriven assist a helicopter pilot in maintaining a particular course and/or heading. In another example, an inceptor that is backdriven assists the driver of a vehicle with maintaining a stable velocity while driving down-hill.

It is to be appreciated that when an operator utilizes an inceptor that is backdriven, the backdriven inceptor may inadvertently come into contact with the operator's limb. This unintentional contact by the operator's limb with the inceptor that is backdriven is received as input by the control system. Moreover, the unintentional contact by the operator may be amplified by the control system.

SUMMARY

In several aspects of the present disclosure, a control system for a machine having a variable operator interface (VOI) is disclosed. The control system includes one or more processors and a memory coupled to the one or more processors. The memory stores program code that, when executed by the one or more processors, causes the control system to detect an existence and a first direction of an operator control input (62) to one or more active inceptors being backdriven from an operator on inceptor detector (OID). The control system is also caused to compare the first direction of the operator control input with a second direction of one or more zero-force detent rates to determine a variance. The control system is caused to interpret the operator control input as inadvertent based on the variance between the first direction and the second direction. In response to interpreting the operator control input as inadvertent, the control system is caused to limit the operator control input to reduce or substantially eliminate movement of the machine caused by inadvertent input by modifying the operator control input based on one or more command modifiers.

In another aspect, a method for limiting operator control input in a machine is disclosed. The machine includes a control system having a variable operator interface (VOI). The method includes detecting, by a control module, an existence and first direction of the operator control input to one or more active inceptors being backdriven from an operator on inceptor detector (OID). The method further includes comparing the first direction of the operator control input with a second direction of one or more zero-force detent rates to determine a variance. The method also includes interpreting the operator control input as inadvertent based on the variance between the first direction and the second direction. In response to interpreting the operator control input as inadvertent, the method includes limiting the operator control input to reduce or substantially eliminate movement of the machine caused by inadvertent input by modifying the operator control input based on one or more command modifiers.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a variable operator interface (VOI) based control system for backdriven active control input devices encountering inadvertent human operator limb interference. In several aspects, the variable operator interface VOI based control system of the present disclosure may be applied to any mechanical, hydraulic, pneumatic, and/or computerized system having a human operator in control of or otherwise utilizing active control input devices to manage operational characteristics of the mechanical or computerized system. That is, the VOI based control system may be used with mechanical, pneumatic, hydraulic, and electrical apparatuses, or any combination thereof. In some examples, the VOI based control system may be used with manufacturing tools, construction equipment, drilling machines, multi-axis machining tools, or the like without departing from the scope or intent of the present disclosure. However, for ease of understanding, the bulk of this disclosure will focus on applications of the VOI based control system to vehicles.

Figure 1:
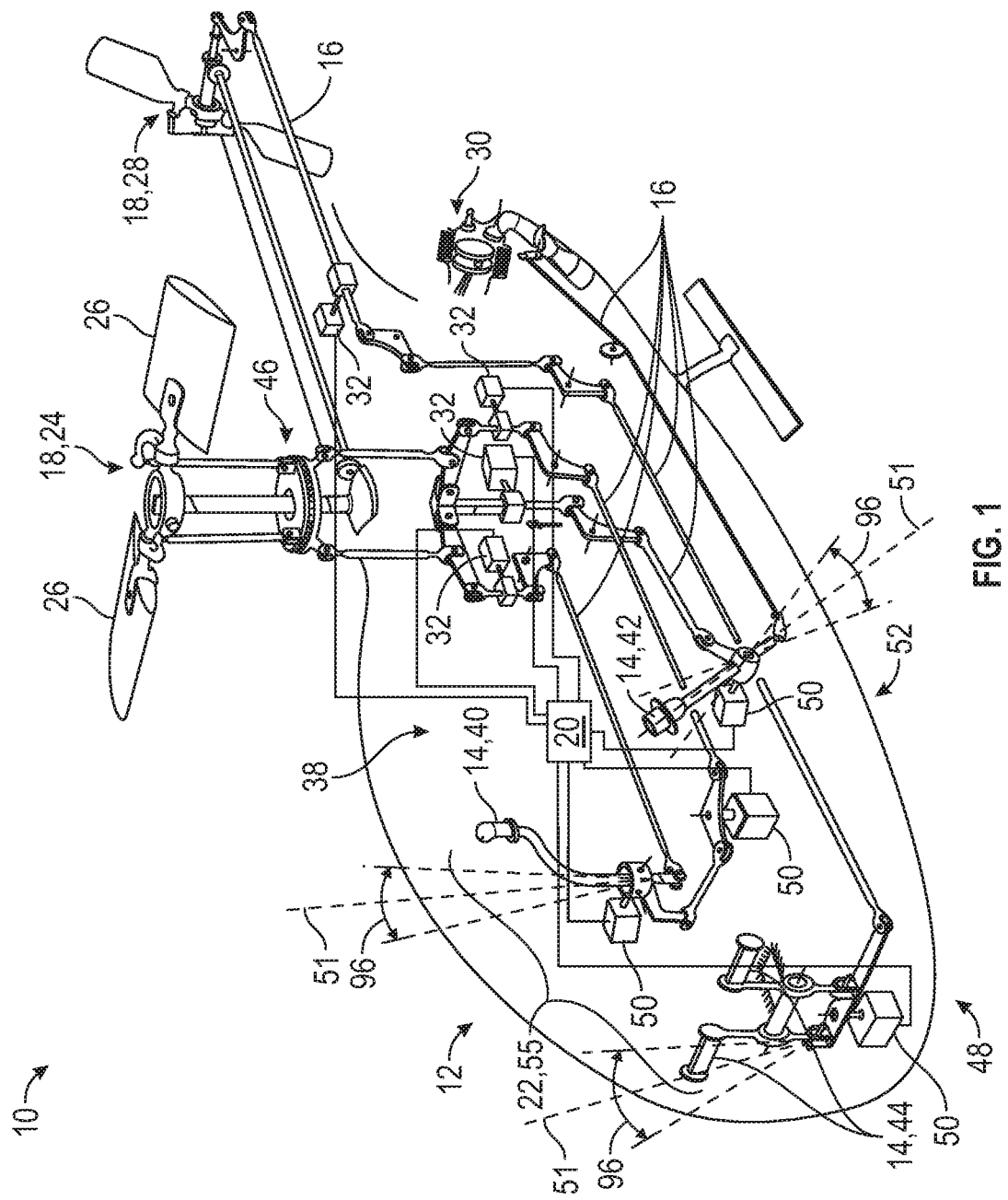
FIG. 1 is a perspective transparent environmental view of a helicopter equipped with a variable operator interface (VOI) system for backdriven active control input devices according to an exemplary embodiment.

Turning now to FIG. 1, a machine 10 is shown. The machine 10 is depicted as a helicopter 12. In one embodiment, the machine 10 is a vehicle. A vehicle may include, but is not limited to, a fixed or variable-wing aircraft, a rotorcraft, a spacecraft, a car, a sport utility vehicle (SUV), a van, a truck, a semi-truck, a train, a watercraft and/or other submersibles without departing from the scope or intent of the present disclosure. In several aspects, the machine 10 includes a plurality of control input devices. The control input devices are referred to as active inceptors 14.

The helicopter 12 of FIG. 1 is shown with a plurality of mechanical linkages 16 connecting the active inceptors 14 with a plurality of control effector devices 18. However, it is to be appreciated that in some machines 10, the mechanical linkages 16 may be partially or entirely replaced by electrical circuitry, hydraulic and/or pneumatic lines, or any combination thereof. A control module 20 receives control inputs from the active inceptors 14 of an operator interface 22 and relays movement commands from the active inceptors 14 to inline actuators 32 that cause movement or actuation of the control effector devices 18.

The control effector devices 18 of the helicopter 12 of FIG. 1 include at least a main rotor 24 having a plurality of main rotor blades 26. In some examples, the control effector devices 18 further include a tail rotor 28. If the helicopter 12 includes tandem rotors, then a second main rotor (not shown) having a second plurality of main rotor blades (also not shown) is provided. Both the main rotor 24 and tail rotor 28 are powered by an engine 30. In several aspects, the engine 30 is an internal combustion engine (ICE) such as a diesel engine, a gasoline engine, an electric motor, a turbine engine, or any other type of prime mover. In another embodiment, if the machine 10 is a fixed-wing aircraft-type machine 10 (not shown), then the control effector devices 18 include an engine 30, motor, or other prime mover operably connected to a throttle, and a steering mechanism operably connected to one or more of ailerons, one or more elevators, one or more rudders, and one or more braking systems. In further examples of fixed wing aircraft, the machine 10 may be an unpowered machine 10 such as a glider or the like. The control effector devices 18 of such an unpowered fixed-wing aircraft-type machine 10 include a steering mechanism operably connected to a plurality of ailerons, one or more elevators, one or more rudders, and one or more braking systems. In the example of a motorized machine 10 such as an automobile, the control effector devices 18 include a plurality of brakes operable via a braking system, an engine 30, motor, or other prime mover operably connected to a throttle, and a steering wheel operably connected to steerable wheels. Likewise, in examples of watercraft-type vehicles, the control effector devices 18 may include an engine 30, motor, or other prime mover operably connected to a throttle, a rudder, a dive plane, a thruster, or the like operably connected to a steering mechanism and/or a roll, a pitch, and/or a yaw adjustment mechanism. In an embodiment, each of the control effector devices 18 is actively movable or actuatable by an inline actuator 32. The inline actuator 32 is capable of mechanically, electrically, pneumatically, or hydraulically moving the control effector devices 18 to manage, maintain, or alter a current machine state 33. In several aspects, the inline actuators 32 are electrical motors, linear actuators, or the like, however it should be appreciated that any mechanical, electrical, hydraulic, or pneumatic actuator may be used depending on the particular application.

In each of the foregoing machine 10 examples, the control effector devices 18 are controlled by a control module 20 operably connected to the operator interface 22 disposed within a cabin 38 of the machine 10. The operator interface 22 includes one or more active inceptors 14 operably connected to the control effector devices 18 of the machine 10. The active inceptors 14 of the helicopter 12 of FIG. 1 include a cyclic 40, a collective 42, and anti-torque pedals 44. The cyclic 40 is an active inceptor 14 movable in at least longitudinal and lateral directions and operates to vary a pitch of the main rotor blades 26 with fore and aft (longitudinal) movement. Varying the pitch of the main rotor blades 26 tilts the main rotor 24 disk forward and/or aft via a swashplate 46. By tilting the main rotor 24 in a longitudinal direction, movement of the nose 48 of the helicopter 12 is induced, causing the nose 48 to pitch up or down depending on the movement of the cyclic 40. Thus, a pilot of the helicopter 12 uses the cyclic 40 to adjust forward speed and control rolled turns of the helicopter 12 as well as to control fore/aft movement of the helicopter 12 in hovering flight. When manipulating the cyclic 40 in a side-to-side (lateral) direction, the cyclic 40 tilts the main rotor 24 disk left and right via the swashplate 46 in a lateral direction, thereby inducing the helicopter 12 to roll in the direction in which the cyclic 40 has been moved. Thus, a pilot of the helicopter 12 uses the cyclic 40 to adjust lateral or sideways movement of the helicopter 12 in both forward and rearward flight, as well as in hovering flight.

The collective 42 is an active inceptor 14 that changes an angle of attack of the main rotor blades 26 via the swashplate 46. Altering the angle of attack of the main rotor blades 26 increases or decreases a pitch angle of all of the main rotor blades 26 equally, thereby causing the helicopter 12 to ascend or descend accordingly. Furthermore, altering the angle of attack of the main rotor blades 26 increases or decreases torque, thereby translating into thrust and lift for the helicopter 12. In one embodiment, throttle controls managing the engine 30 of the helicopter 12 are interlinked with the collective 42. In forward and/or rearward flight, the collective 42 operates to adjust power through the main rotor 24 via a main rotor blade 26 pitch setting, while in hovering flight, the collective 42 adjusts helicopter 12 height and/or vertical speed.

The anti-torque pedals 44 of the helicopter 12 are active inceptors 14 that control collective pitch supplied to the tail rotor 28. Thus, the anti-torque pedals 44 have the primary effect of managing a yaw or rotational rate of the helicopter 12. In forward and/or rearward flight, the anti-torque pedals 44 adjust a sideslip angle of the helicopter 12, and in hovering flight, the anti-torque pedals 44 control a yaw rate and heading direction for the helicopter 12.

One or more of the active inceptors 14 of the operator interface 22 is actively backdriven. An active inceptor 14 is configured to provide tactile cues to the pilot or operator of the helicopter 12 and also provides backdrive functionality. To provide the active backdrive functionality and tactile cues for the pilot, active inceptors 14 are equipped with a backdrive actuator 50. A key tactile cue provided by the backdrive actuator 50 is a zero-force detent 51. The backdrive actuator 50 manipulates or moves the position of the zero-force detent 51 on the active inceptors 14 that reflects an inceptor position required to maintain a current machine state 33. The backdrive actuator 50 backdrives each active inceptor 14 through the zero-force detent 51. For example, the cyclic 40 of the helicopter 12 is positioned at the zero-force detent 51 to maintain a given flight course or heading. However, an operator may exert a breakout force upon the cyclic 40 to change the current flight course or heading of the helicopter 12. Specifically, the cyclic 40 is urged or moved out of the zero-force detent 51 when the breakout force is applied.

As an example, during an automated flight of a helicopter 12 of the present disclosure, the cyclic 40, collective 42, and anti-torque pedals 44 may be actively moved and adjusted by an onboard flight system to maintain a particular main rotor 24 and tail rotor 28 positioning, trims, and power levels. Accordingly, the helicopter 12 follows a flight course or heading without operator or pilot force input. In order to counteract torque imparted to a fuselage 52 of the helicopter 12 by the main rotor 24, the onboard flight system may command the anti-torque pedals 44 to move to a position commensurate with the desired flight course or heading, and to maintain the desired flight course or heading by constantly adjusting the position of the anti-torque pedals 44. Accordingly, the anti-torque pedals 44, as well as the collective 42, and the cyclic 40 may be actively backdriven via the zero-force detent 51 as the onboard flight system operates continuously to maintain a given flight course or heading. The zero-force detent 51 represents the required position of the active inceptors 14 to maintain the desired flight course or heading. The zero-force detent 51 alleviates series actuator saturation, gives the pilot or operator an indication of what the helicopter 12 is doing at a given point in time, and allows the pilot to make off-axes control inputs necessary to maintain a current machine state 33, such as a heading when control inputs are made in other axes. Moreover, the zero-force detent 51 offers the pilot an indication of where the vehicular trim is at a given point in time and showing how much control authority remains over the various active inceptors 14 which are equipped to the helicopter 12.

Figure 2:
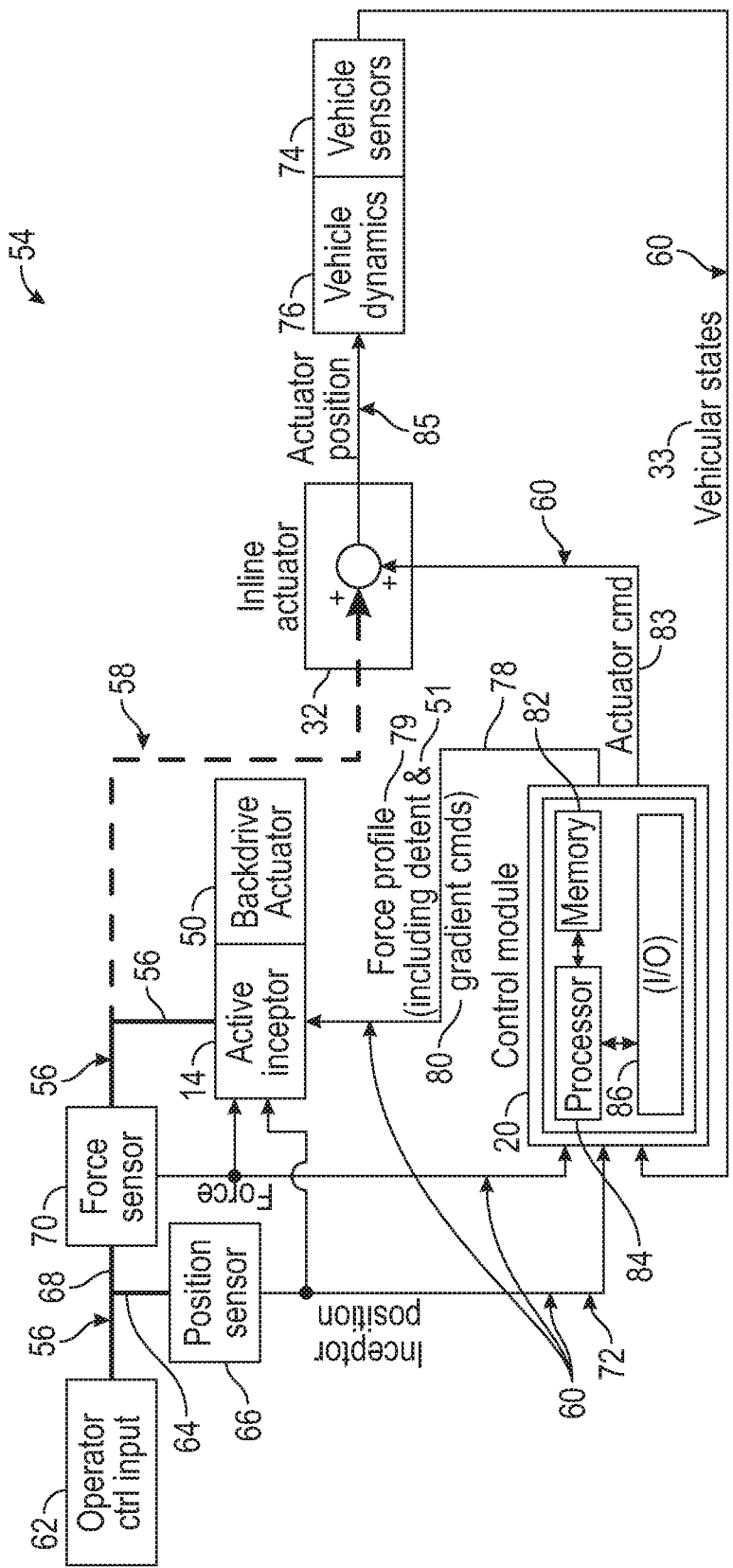
FIG. 2 is a system diagram of a control system supporting the use of a variable operator interface VOI according to an exemplary embodiment.

Turning now to FIG. 2, and with continuing reference to FIG. 1, the helicopter 12 is equipped with a control system 54 having an operator interface 22 that provides variable feedback to the operator. That is, the operator interface 22 is a variable operator interface (VOI) 55. The VOI 55 includes each of the active inceptors 14 in the control system 54 and provides an operator the ability to manipulate positions of the various control effector devices 18 via the active inceptors 14. The VOI 55 also provides active backdrive functionality through the backdrive actuators 50 for each of the active inceptors 14. Thus, the VOI 55 provides the operator with information regarding the current machine state 33 by the positions of the zero-force detents 51 of each of the active inceptors 14. More specifically, FIG. 2 depicts a control system 54 for a generic active inceptor 14 that is backdriven in which the VOI 55 of the present disclosure may be used. Mechanical signals 56 connect the various components of the control system 54. Optional mechanical signals 58 may, in some examples, connect some or all of the components of the control system 54. Electrical signals 60 also connect various components of the control system 54. However, it is to be appreciated that that the control system 54 of FIGS. 1 and 2 may vary in componentry and in terms of the mechanical signals 56, and/or optional mechanical signals 58, and/or electrical signals 60 utilized between the various components of the control system 54 without departing from the scope or intent of the present disclosure. Additionally, the VOI 55 may be used in fully digitally controlled (e.g. fly-by-wire or fly-by-light) control systems 54 with active inceptors 14 as well as partial authority mechanical control systems 54 (e.g. an active parallel actuation system (APAS)) with active inceptors 14. In some aspects, the optional mechanical signals 58 are required for mechanical control systems 54, but not necessarily for fully digital or electrical control systems 54.

In FIG. 2, the control system 54 receives an operator control input 62 to one or more of the active inceptors 14. Specifically, the operator control input 62 is received as a position input 64 to a position sensor 66 and a force input 68 to a force sensor 70. The position input 64 indicates an absolute position of the active inceptor 14 compared to a reference position, such as the zero-force detent 51. The force input 68 indicates a quantity of force that the operator uses to adjust the position of the active inceptor 14. Primarily, the force input 68 is proportional to the displacement the operator moves the active inceptor 14 from the zero-force detent 51 position. The force input 68 and the position input 64 are communicated as an inceptor position 72 to the control module 20.

The control module 20 executes instructions to receive the inceptor position 72 from the active inceptor 14. Specifically, the control module 20 executes instructions to receive the inceptor position 72 from the position sensor 66 and the operator input force from the force sensor 70. Additional instructions to receive current machine states 33 such as vehicle dynamics, gyroscopic position, velocity, altitude, bank angle, and the like from a plurality of vehicle sensors 74 are also received by the control module 20. In several aspects, the plurality of vehicle sensors 74 are used by the control module 20 to manage operations of the machine 10, helicopter 12, or the like. In an example, the vehicle sensors 74 are used by the control module 20 to determine and manage vehicle dynamics 76, such as flight trajectory, path, or other such movement.

The control system 54 is configured to mitigate the effects of unintended or inadvertent operator input due to an active inceptor 14 being backdriven. More specifically, the control system 54 limits the operator control input 62, which in turn reduces or substantially eliminates any movement of the machine 10 created by the inadvertent input. The operator control input 62 is limited by one or more command modifiers, which are described in greater detail below. The control module 20 compares a first direction of the operator control input 62 with a second direction of one or more detent rates D, and determines a variance between the two directions. The control module 20 interprets the operator control input 62 as inadvertent based on the variance between the first direction and the second direction. In response to interpreting the operator control input 62 as inadvertent, the control module 20 limits the operator control input 62 to reduce or substantially eliminate movement of the machine 10 caused by inadvertent input by modifying the operator control input 62 based on one or more command modifiers.

The command modifiers limit the operator control input 62 utilizing data from the position sensor 66, the force sensor 70, and the plurality of vehicle sensors 74. Having applied the command modifiers, the control module 20 sends a first command 78 to the active inceptor 14. The first command 78 includes a force feel profile 79 component of the first command 78 including the zero-force detent 51 and a detent force gradient 80. The control module 20 also sends a second actuator command 83, sometimes termed a series actuation command, to one or more inline actuators 32, thereby adjusting a position of the control effector device 18 movable via the relevant inline actuator 32 in response to the operator control input 62. In an example of a mixed electronic and mechanical control system 54, the inline actuator 32 actually combines a mechanical command and an electromechanical command. The inputs to the inline actuator 32 includes both the optional mechanical signal 58 from the operator control input 62 through the force sensor 70, and the electrical signal 60 to the inline actuator 32. The electrical signal 60 is generated by the control module 20. Accordingly, the resulting actuator position 85 representing the inline actuator 32 position includes optional mechanical signal 58, and components of the electrical signal 60. In contrast, in an example of a full fly-by-wire control system 54, the optional mechanical signals 58 are not present and the only input into the inline actuator 32 is an electrical signal 60 from the control module 20 actuator command 83. Therefore, in such a fly-by-wire control system 54, series actuation and/or series actuator saturation does not occur. It should be appreciated that variations from the above described fly-by-wire control system 54 and mixed mechanical and electronic control system 54 are intended to be within the scope of the present disclosure.

In one embodiment, the operator control input 62 is either an automatic input from the control module 20, an operator control input 62 from a human operator, a plurality of either, or any combination thereof. In one example, the operator control input 62 is a programmatic input generated by flight or drive control logic stored within a memory 82 of the control module 20 and executed by a processor 84 of the control module 20. The control input is then communicated, via the input/output (I/O) interface 86 of the control module 20, from the processor 84 to the specific backdrive actuator 50, actuator command 83, or both, to adjust the actuator position 85 to affect an attitude, position, or the like of the machine 10. In an example of a machine 10, the inline actuator 32 manipulates or moves one or more of the control effector devices 18 and thereby acts to control one or more direction of movement of the machine 10.

Figure 3:
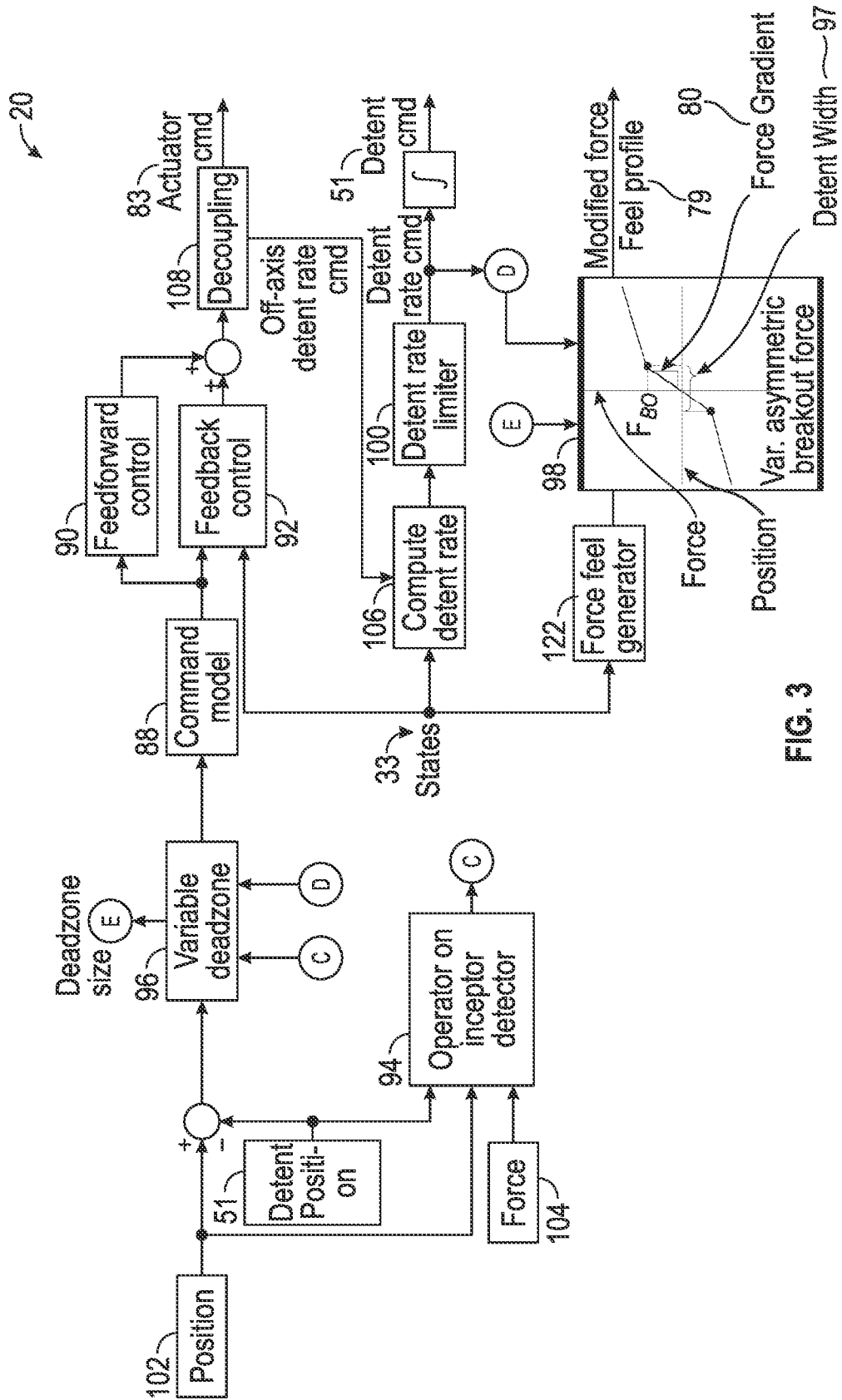
FIG. 3 is a system diagram of the control module having a variable operator interface VOI for backdriving active inceptors showing an operator on inceptor detector (OID), a variable inceptor command deadzone (VICD), a variable asymmetric breakout force (VABF), and a detent rate limiter (DRL) according to an exemplary embodiment.

Turning now to FIG. 3, and with continuing reference to FIGS. 1 and 2, the helicopter 12 is equipped with the control module 20 having a VOI 55 for active inceptors 14. The VOI 55 combines a plurality of control-law based methods to alleviate unintentional commands to the current machine state 33 caused by inadvertent contact or interference with the active inceptors 14 during operation. In many examples, inadvertent contact or interference with the active inceptors 14 that are backdriven occurs in a direction opposite to that which the operator desires. The use of a plurality of control-law based methods allows for the retention of sophisticated control law approaches such as command model 88 following, feed forward control 90, and feedback control 92; each of which improve the ability of the operator to control the current machine state 33. The active inceptor 14 is operatively coupled to a processor 84 of control module 20 in a known manner to allow a user to interact directly with the control module 20

The command modifiers, which limit movement of the machine 10 created by inadvertent operator input, are now described in greater detail. Referring to FIG. 3, the command modifiers include one or more of an operator on inceptor detector (OID) 94, a variable inceptor command deadzone (VICD) 96, a force feel profile 79 of the first command 78 via a variable asymmetric breakout force (VABF) 98, and a detent rate limiter (DRL) 100. The OID 94 is used to detect the existence and first direction of an operator control input 62 to the active inceptor 14. The OID 94 receives a position of the active inceptor 14 as a position input 102 from the position sensor 66 and/or a difference of the commanded zero-force detent 51 and the position of the active inceptor 14. The OID 94 also receives a force input 104 from the force sensor 70 where the force input 104 indicates a force applied to the active inceptor 14 by the operator. The OID 94 generates an OID output C indicating whether the operator is using the active inceptor 14 and if so, the existence and first direction of the operator control input 62. The OID output C is received as a VICD 96 input.

Backdriven movement of an active inceptor 14 is commanded by the control module 20. As the active inceptor 14 is moved by the control module 20, the zero-force detent 51 moves as well. That is, the active inceptor 14 moves in accordance with a computer controlled or commanded force feel profile 79 component of the first command 78. If no force is applied by the operator, the active inceptor 14 merely moves with the zero-force detent 51. The movement of the zero-force detent 51 may be referred to as a zero-force detent rate D. The zero-force detent rate D is computed by the control module 20 and represents a commanded rate and directionality of movement of the zero-force detent 51 of the one or more active inceptors 14 as commanded by the control module 20. In some aspects, the zero-force detent rate D from an off-axis detent rate command from decoupling 108 and machine states to the one or more active inceptors 14 is calculated. More specifically, the zero-force detent rate D from the off-axis detent rate command is calculated in part by decoupling 108 on-axis operator control inputs 62 and off-axis operator control inputs 62 to the one or more active inceptors 14. The decoupled off-axis operator control inputs 62, in combination with the current machine state 33 are taken as input to compute 106 an overall detent rate in the on-axis direction. Stated in a somewhat different manner, the overall detent rate in an off-axis direction is computed by using the off-axis operator control inputs in combination with a current machine state 33. That is, the zero-force detent rate D is a function of the off-axis operator control inputs and the current machine state 33.

When a first direction of the operator control input 62 is in a commanded zero-force detent rate D direction, the operator control input 62 is understood by the control module 20 to be an intentional or deliberate input to the active inceptor 14. By contrast, when the first direction of the operator control input 62 is opposite to that in which the active inceptor 14, and the zero-force detent 51 are being moved by the control module 20, there is an increased likelihood that the operator control input 62 is inadvertent. When the first direction of the operator control input 62 is opposite to the commanded zero-force detent rate D direction, the control module 20 executes control logic or instructions that alter physical characteristics of the VICD 96 and/or the VABF 98. In one example, the control module 20 executes instructions that alter the VICD 96 when the direction of the active inceptor 14 movement is indicative of inadvertent contact with the operator.

The control module 20 utilizes the OID 94 to determine whether the operator is actively using the active inceptor 14 as well as the direction of movement of the active inceptor 14 based on position information received by the position sensor 66 and force information received by the force sensor 70. In a specific example utilizing only position information received by the position sensor 66, inadvertent contact between the active inceptor 14 and the operator occurs when the second direction does not equal the first direction of the operator control input 62 to the active inceptor 14. The control module 20 determines that inadvertent contact between the operator and the active inceptor 14 is occurring when the first sign of the zero-force detent 51 movement direction does not equal a second sign of the operator control input 62 movement direction. Utilizing additional sophisticated sub-elements, such as the VICD 96, can be used to substantially eliminate the effects of inadvertent contact between the operator and the active inceptor 14.

Figure 4:
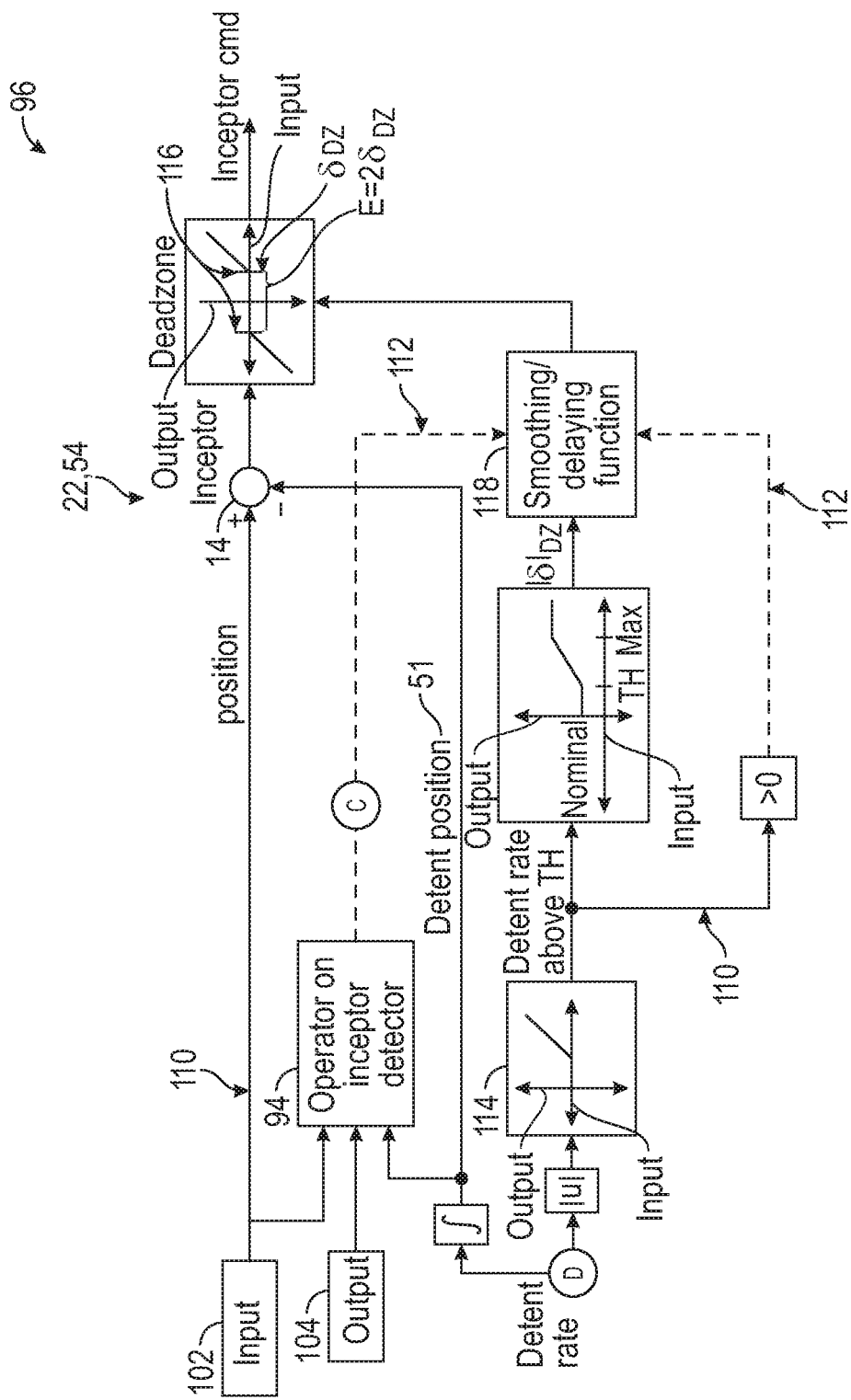
FIG. 4 is a system diagram of a portion of a variable operator interface VOI for backdriving active inceptors depicting a variable inceptor command deadzone (VICD) according to an exemplary embodiment.

Turning now to FIG. 4, and with continuing reference to FIG. 3, a portion of the control module 20 is shown in greater detail with a particular focus on the VICD 96. In FIG. 4, the solid lines 110 indicate control signals to and from various components of the control system 54, while dashed lines 112 indicate control logic. The control module 20 determines the VICD 96 based on a zero-force detent rate D relative to a predetermined threshold 114 of the zero-force detent rate D and applies the VICD 96 to an input of the command model 88. The control modules 20 also determines a VICD 96 size E as a function of zero-force detent rate D; and a VICD size E smoothing/delaying function 118 adjusted by the OID 94 and the zero-force detent rate above the predetermined threshold 114. The VICD size E is a function of how far the zero-force detent rate D is above the predetermined threshold 114 rate. More specifically, the VICD size E is calculated in part by determining the zero-force detent rate D above the predetermined threshold 114 of the zero-force detent rate D and calculating a VICD size E based on the zero-force detent rate D above the threshold 114 zero-force detent rate D. Below the predetermined threshold 114 rate, the operator is likely to have time to recognize movement of the zero-force detent 51 and move to follow the zero-force detent 51 without opposing the motion of the zero-force detent 51. Above the predetermined threshold 114, the faster the zero-force detent rate D is, the larger the spacing is between the VICD 96 boundaries 116, and the larger the VICD size E is, in order to accommodate the operator's relative inability to follow the movements of the active inceptor 14. The increased VICD size E results in the control system 54 rejecting inadvertent operator control inputs 62 due to the operator not following the position of the zero-force detent 51. However, the variation in VICD size E is limited to prevent excessive delay in intentional operator control inputs 62. In some aspects low pass filtering and/or time delays of the VICD 96 size E may be used to improve performance by preventing rapid changes in operator control inputs 62 if the VICD size E changes rapidly as the zero-force detent rate D returns below the predetermined threshold 114 rate. That is, in determining the VICD size E, the control module 20 applies a smoothing/delaying function 118 adjusted by the OID 94 to the VICD 96 by applying low-pass filtering or time delays of the VICD 96, thereby reducing or substantially eliminating rapid changes in VICD size E as the zero-force detent rate D returns below the predetermined threshold 114 of the zero-force detent rate D. In other aspects, low pass filtering and/or time delays of the VICD size E are relatively slow when the zero-force detent rate D is slowing and the VICD size E is returning to a nominal size. Accordingly, the VICD size E is used by the control module 20 to reject inadvertent commands when the operator is not easily able to move out of the way of an active inceptor 14 that is backdriven while admitting or allowing intentional operator control input 62 commands.

Referring once more to FIG. 3 and with continuing reference to FIGS. 1-2, and 4, the control module 20 also determines the VABF 98. The VABF 98 modifies the force feel profile 79 component of the first command 78 generated by a force feel generator 122. In some aspects, the force feel profile 79 component of the first command 78 of the VICD 96 is substantially linear within a detent width 97, and the detent force gradient 80 decreases outside the detent width 97. However, it should be appreciated that depending on the application, the force feel profile 79 component of the first command 78 may vary substantially, and in some examples may instead be discontinuous, exponential, logarithmic, or the like without departing from the scope or intent of the present disclosure. In several aspects, for the operator to better identify when a position of the active inceptor 14 is not keeping up with a reference position, a higher active inceptor 14 force breakout or zero-force detent force gradient is required when the first direction of the operator control input 62 is not in the zero-force detent rate D direction. Various detent force gradient 80 modification strategies, or combinations thereof, may be employed without departing from the scope or intent of the present disclosure. In one example, the VABF 98 is control software specific to the active inceptor 14 and includes logic that adjusts the force feel profile 79 component of the first command 78 to align with the VICD 96 set within control software of the control module 20, by adjusting the detent force gradient 80 component of the first command 78, and adjusting a width of a detent spring feel, or detent width 97. The VABF 98 is determined in part by modifying the force feel profile 79 generated by the force feel generator 122 operably connected to the one or more active inceptors 14 by adjusting the breakout force $F_{BO}$ along the detent force gradient 80 of the one or more active inceptors 14 as the zero-force detent rate D changes.

In a first example, the VABF 98 includes adjusting a breakout force position to follow VICD 96 boundaries 116 generated as a part of the VICD size E. The VABF also includes setting the breakout force $F_{BO}$ to be proportional to the zero-force detent rate D and increasing the breakout force $F_{BO}$ when the first direction of the operator control input 62 is opposite to the zero-force detent rate D direction as determined by the OID 94. In several aspects, the VICD 96 is a portion of a range of motion of a given active inceptor 14 centered around the zero-force detent 51. The VICD 96 offers an operator the opportunity to manipulate the active inceptor 14 through a portion of the active inceptor's 14 range of motion without the control module 20 translating the active inceptor 14 movement into a command of the command model 88 that then generates the actuator position 85 command, affecting a position of the inline actuator 32. In several aspects, the control module 20 translates movement of the active inceptor 14 into the sum of the optional mechanical signals 58 and the actuator command 83 to affect a position of one or more of the inline actuators 32. That is, the VICD 96 is sized to prevent operator control inputs 62 to the active inceptor 14 from being taken as a command in the control module 20. Accordingly, in the absence of any disturbances, and for a stable system, there will be no resultant change in position of the inline actuators 32 when it is likely that the operator control inputs 62 are unintentional. In several aspects, the force feel generator 122 is a mechanical or electrical device providing force feel via the active inceptor 14 to the operator. The force feel generator 122 provides a variable force feel profile 79 which includes the detent force gradient 80 and the breakout force $F_{BO}$ level. In an example, a quantity of resistance to movement of the active inceptor 14 increases as the active inceptor 14 is moved away from the zero-force detent 51 and towards the boundaries 116 of the VICD 96. That is, aligning the breakout position with the boundaries 116 of the VICD 96 allows the operator to feel when the operator control inputs 62 are being accepted or admitted by the control module 20 and translated into movement of the machine. When zero-force detent rates D are large, and the resulting VICD 96 is wide, the active inceptor 14 may have a less precise feel to the operator. Lower precision is, in some examples, due to a decrease in the aggressiveness or steepness of the detent force gradient 80 for VICD 96 breakout and results in the active inceptor 14 less precisely tracking the zero-force detent 51 as well.

In a second example, the VABF 98 is adjusted such that the breakout force $F_{BO}$ is substantially proportional to the zero-force detent rate D. When the breakout force $F_{BO}$ increases with the zero-force detent rate D, it may be easier for the operator to follow the zero-force detent 51. In several aspects, the VICD 96 size E does not need to be increased when the breakout force $F_{BO}$ increases proportionally with the zero-force detent rate D because the detent width 97 of the force feel profile have a distinctive feel to the operator. Because the breakout force $F_{BO}$ resisting movement of the active inceptor 14 out of the VICD 96 increases substantially proportionally with the zero-force detent rate D, the relatively high breakout forces $F_{BO}$ may result in decreased operator control input 62 command precision when attempting to intentionally apply commands to the machine 10, helicopter 12, or the like. That is, by comparison with the variable force feel profile 79 of the first example, the proportional breakout force $F_{BO}$ of the second example provides distinct VICD 96 boundaries 116 but may result in reduced command precision under certain circumstances, while the variable force feel profile 79 of the first example provides increased feel but may result in lowered precision relative to the second example under certain circumstances.

The DRL 100 is a rate limit applied to the commanded zero-force detent 51. In several aspects, the DRL 100 has the effect of slowing the zero-force detent 51 from what the control system 54 would produce to provide optimal functionality to the operator. Imposing a DRL 100 reduces or substantially eliminates the occurrence of an inadvertent operator control input 62 because, if the zero-force detent 51 does not move, there is no possibility of inadvertent contact or interference between the active inceptor 14 and the operator. Setting the DRL 100 to zero prevents the control system 54 from backdriving the active inceptor 14 at all. Accordingly, the DRL 100 is optimized to alleviate the effects of inadvertent contact or interference between the active inceptor 14 and the operator. In several aspects, the precise DRL 100 chosen depends substantially on the application. The DRL 100 is also adjusted to account for the use or application of one or more of the OID 94, the VICD 96, and the VABF 98 in combination with the DRL 100.

Utilizing some or all of the OID 94, the VICD 96, the VABF 98, and the DRL 100, the control module 20 may substantially filter out or eliminate unintentional or inadvertent operator control inputs 62 to the active inceptor 14. In an example, in response to the operator control input 62, the VICD 96, the VABF 98, and the DRL 100, the control module 20 may filter out operator control input 62 that have a high likelihood of being unintentional. More specifically, the control module 20 limits the operator control input 62 in response to interpreting the operator control input 62 as inadvertent based on a difference between the first direction of the operator control input 62 and the second direction in which the active inceptor 14 is being backdriven, and reduces or substantially eliminate movement of the machine 10 by applying one or more of the VICD 96, the VABF 98, and the DRL 100 to the operator control input 62. Limiting or reducing acceptance of unintentional operator control inputs 62 reduces or substantially eliminates undesirable movement of the machine 10, helicopter 12, or the like, via the one or more inline actuators 32 when it is likely that operator control inputs 62 are unintentional. By reducing or substantially eliminating undesirable movement of the machine 10, helicopter 12, or the like, in response to unintentional operator control inputs 62, the control module 20 preserves operator control input 62 sensitivity. Thus, the control module 20 reduces the translation of unintentional operator control inputs 62 to the one or more inline actuators 32.

Figure 5:
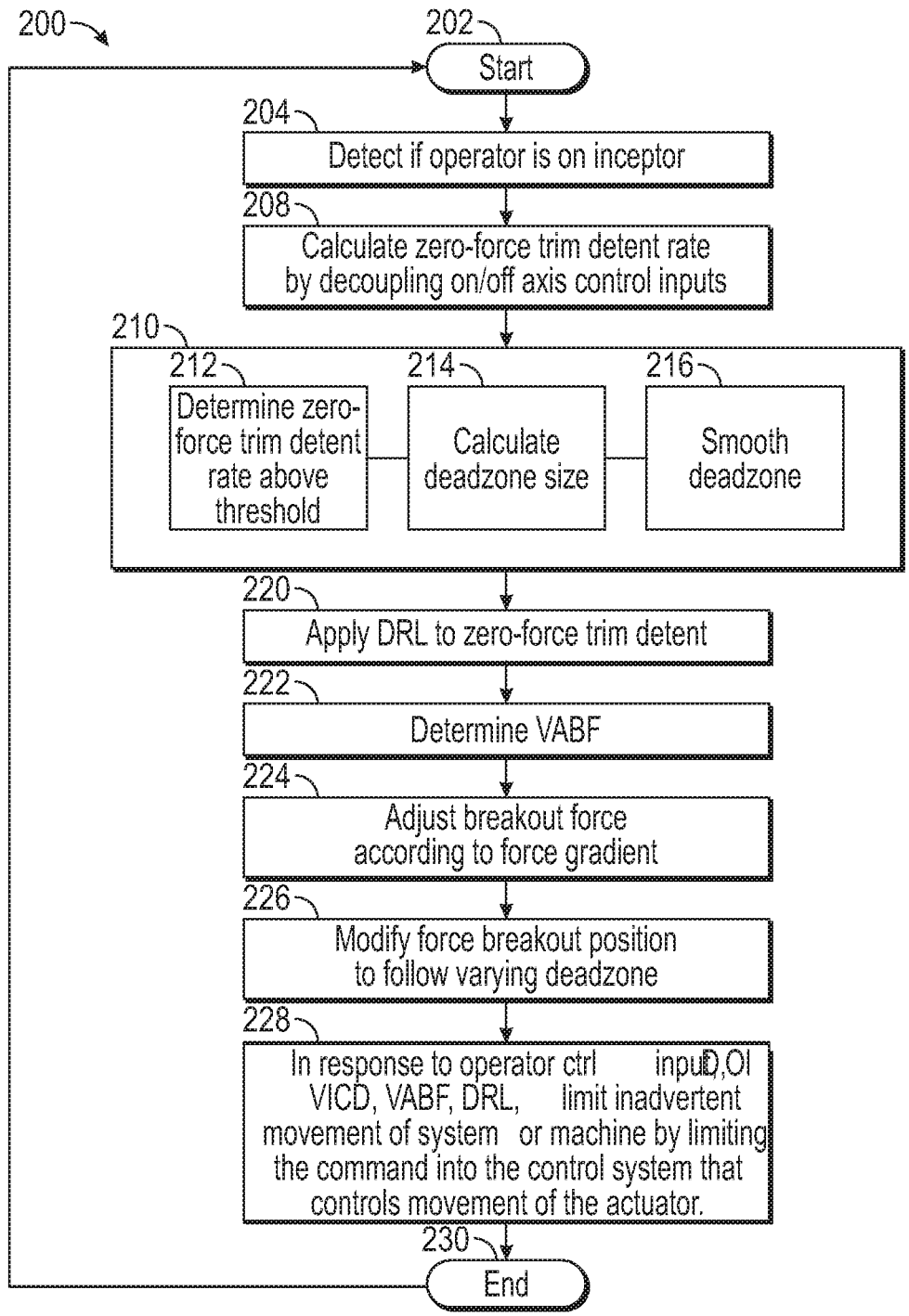
FIG. 5 is a flow diagram depicting a method of using a variable operator interface VOI for backdriving active inceptors according to an exemplary embodiment.

Turning now to FIG. 5 a method 200 of using a VOI of the present disclosure is shown. The method 200 begins at block 202 where the method receives an operator control input 62 to one or more active inceptors 14 with a control module 20. The control module 20 is operably connected to the one or more active inceptors 14 and one or more inline actuator 32. The one or more active inceptors 14 also has a commanded zero-force detent 51. At block 204 the control module 20 detects whether an operator is using the active inceptor 14. In some aspects, the control module 20 determines whether an operator is present by detecting the existence and direction of an operator control input 62 to the active active inceptor 14 from the OID 94. In one specific example, at block 204 the control module 20 determines a sign of the zero-force detent rate D and a sign of the operator control input 62 to the active inceptor 14. Moreover, the control module 20 determines if the sign of the zero-force detent rate D is equal to the sign of the operator control input 62 to the active inceptor 14. At block 208, the control module 20 calculates 89 the zero-force detent rate D by decoupling 91 on-axis operator control inputs 62 and off-axis operator control inputs to the one or more active inceptors 14.

At block 210, the control module 20 determines a VICD 96 deadzone based on the zero-force detent rate D relative to the predetermined threshold 114 of the zero-force detent rate D. The VICD 96 deadzone is based on a plurality of calculations carried out by the control module 20 as described in more detail above. Accordingly, block 210 of the method 200 includes blocks 212-216 to depict the plurality of calculations. Specifically, at block 212, the control module 20 determines the zero-force detent rate D above the predetermined threshold 114 of the zero-force detent rate D. At block 214, the control module 20 calculates a deadzone size E based on the zero-force detent rate D above the predetermined threshold 114 of the zero-force detent rate D. At block 216, the control module 20 smooths the deadzone by applying low-pass filtering and/or time delays to the deadzone. Moreover, at block 216 the control module 20 reduces or substantially eliminates rapid changes in deadzone size E as the zero-force detent rate D returns below the predetermined threshold 114 of the zero-force detent rate D.

The method 200 then proceeds from block 210 to block 220 where the control module 20 applies the DRL 100 to the zero-force detent rate D by applying a rate limit to the commanded zero-force detent 51. At block 222, the control module 20 determines a VABF 98. At block 224, the control module 20 modifies a force feel profile 79 component of the first command 78 generated by the force feel generator 122 operably connected to the one or more active inceptors 14. More specifically, at block 224, the control module 20 adjusts a breakout force $F_{BO}$ generated by the force feel generator 122 of the one or more active inceptors 14 along the detent force gradient 80 in the same direction, or with the same sign as the zero-force detent rate D. In one example, the force feel profile 79 component of the first command 78 is substantially linear within the detent width 97 and the detent force gradient 80 decreases outside the detent width 97. As described hereinabove, the force feel profile 79 component of the first command 78 may vary substantially from application to application, and in some examples, may not be linear at all. At block 226, the control module 20 modifies the breakout force $F_{BO}$ position to follow the VICD 96 and sets the breakout force $F_{BO}$ to be proportional to the zero-force detent rate D. Thus, the control module 20 increases the breakout force $F_{BO}$ when the first direction of the operator control input 62 is opposite to the zero-force detent rate D as determined by the OID 94. At block 228, in response to the operator control input 62, the, the OID 94, VICD 96, the VABF 98, and the DRL 100, the control module 20 interprets the operator control input 62 as inadvertent. Moreover, the control module 20 limits inadvertent movement of the machine 10, helicopter 12, or the like by limiting commands into the control system 54 that control movement of the one or more inline actuators 32 when it is likely that operator control inputs 62 are unintentional. By applying one or more of the VICD 96, the VABF 98, and the DRL 100 to the operator control input 62, the control module 20 reduces or substantially eliminates movement of the machine 10, helicopter 12, or the like via the one or more inline actuators 32. The control module 20 also preserves sensitivity to operator control inputs 62. At block 230, the method 200 ends and returns to block 202 whereupon the method 200 runs continuously.

Referring generally to the figures, technical effects and benefits of the disclosed VOI system for limiting or reducing acceptance by the control module 20 of operator control input 62 to an active inceptor 14 that is backdriven include reduced costs, and decreased potential for inadvertent or unintentional inline actuator 32 movement in response to operator control inputs 62. Conventional approaches for managing movement of machines 10 having active inceptors 14 that are backdriven offer the operator an indication of what a control system 54 is doing to or with the machine 10. An active inceptor 14 that is backdriven may be automatically moved into a space occupied by an occupant or operator, and thereby inadvertently contact the occupant or operator. Such inputs may be interpreted by the control module 20 as operator control inputs 62 to the one or more active inceptors 14, and thereby alter a movement or a trajectory of the machine 10, helicopter 12, or the like. Such alterations of movement or trajectory may lead to operator confusion. In contrast, the disclosed VOI system reduces or substantially eliminates the effects of inadvertent contact between the operator and the active inceptors 14 that are backdriven.

Figure 6:
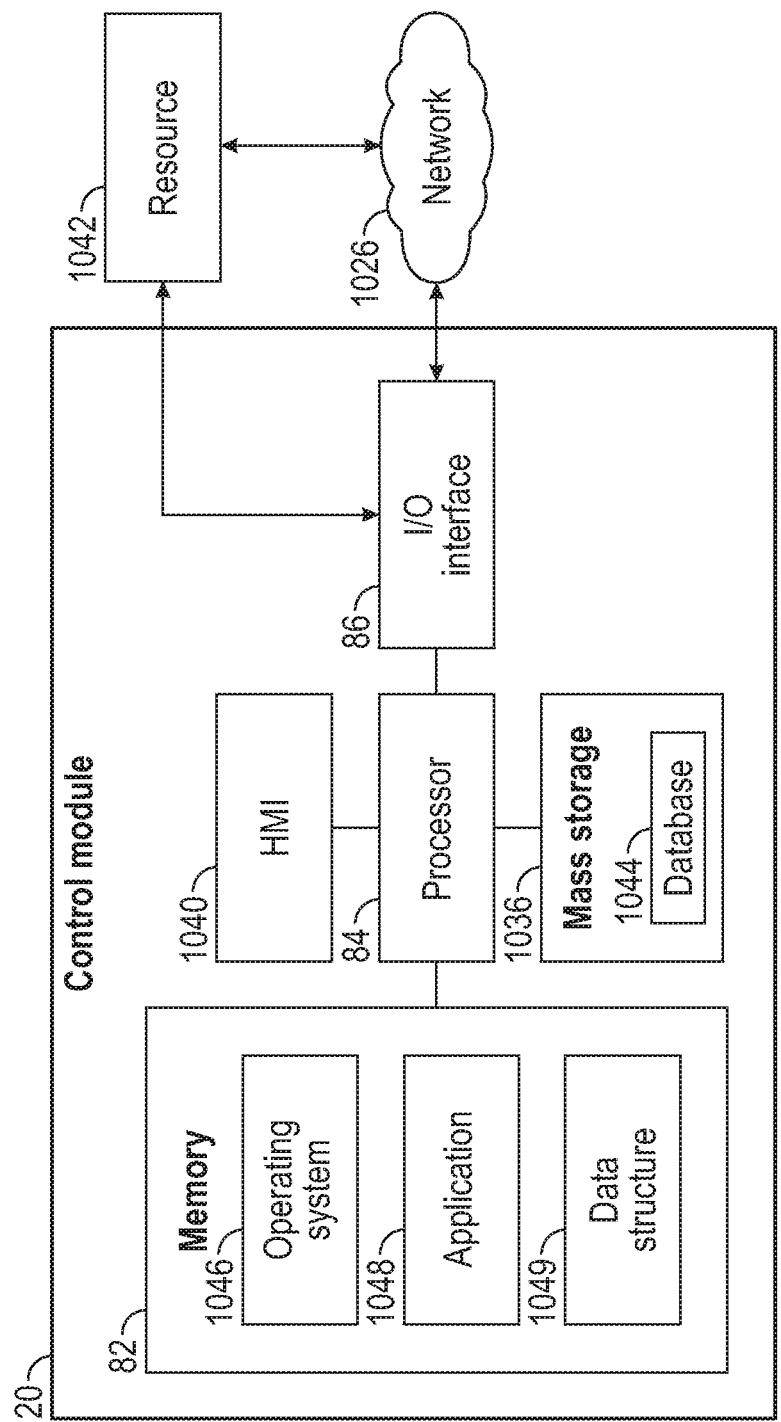
FIG. 6 is a schematic diagram of a control module capable of implementing the VOI according to an exemplary embodiment.

Turning now to FIG. 6, and with continuing reference to FIGS. 1-5, the control system 54 having VRDC is implemented on one or more computer devices or systems, such as exemplary control module 20. The control module 20 includes a processor 84, a memory 82, a mass storage memory device 1036, an input/output (I/O) interface 86, and a Human Machine Interface (HMI) 1040. The control module 20 is operatively coupled to one or more external resources 1042 via a network 1026 or I/O interface 86. External resources may include, but are not limited to, servers, databases, mass storage devices, peripheral devices, cloud-based network services, or any other suitable computer resource that may be used by the control module 20.

The processor 84 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 82. Memory 82 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 136 includes data storage devices such as a hard drive, optical drive, tape drive, volatile or non-volatile solid-state device, or any other device capable of storing information.

The processor 84 operates under the control of an operating system 1046 that resides in memory 82. The operating system 1046 manages computer resources so that computer program code embodied as one or more computer software applications, such as an application 1048 residing in memory 82, may have instructions executed by the processor 84. In an alternative embodiment, the processor 84 may execute the application 1048 directly, in which case the operating system 1046 may be omitted. One or more data structures 1049 also reside in memory 82, and may be used by the processor 84, operating system 1046, or application 1048 to store or manipulate data.

The I/O interface 86 provides a machine interface that operatively couples the processor 84 to other devices and systems, such as the network 1026 or external resource 1042. The application 1048 thereby works cooperatively with the network 1026 or external resource 1042 by communicating via the I/O interface 86 to provide the various features, functions, applications, processes, or modules comprising embodiments. The application 1048 also includes program code that is executed by one or more external resources 1042, or otherwise rely on functions or signals provided by other system or network components external to the control module 20. Indeed, given the nearly endless hardware and software configurations possible, persons having ordinary skill in the art will understand that some examples may include applications that are located externally to the control module 20, distributed among multiple computers or other external resources 1042, or provided by computing resources (hardware and software) that are provided as a service over the network 1026, such as a cloud computing service.

The HMI 1040 is operatively coupled to the processor 84 of control module 20 in a known manner to allow a user to interact directly with the control module 20. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 84.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 84 may be used to access the information or data stored in records of the database 1044 in response to a query, where a query may be dynamically determined and executed by the operating system 1046, other applications 1048, or one or more control modules 20.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control system (54) for a machine (10) having a variable operator interface (VOI) (55), the control system (54) comprising:
   one or more processors (84); and
   a memory (82) coupled to the one or more processors (84), the memory (82) storing program code that, when executed by the one or more processors (84), causes the control system (54) to:
      detect an existence and a first direction of an operator control input (62) to one or more active inceptors (14) being backdriven from an operator on inceptor detector (OID) (94);
      compare the first direction of the operator control input (62) with a second direction of one or more zero-force detent rates (D) to determine a variance;
      interpret the operator control input (62) as inadvertent based on the variance between the first direction and the second direction; and
      in response to interpreting the operator control input (62) as inadvertent, limit the operator control input (62) to reduce or substantially eliminate movement of the machine (10) caused by inadvertent input by modifying the operator control input (62) based on one or more command modifiers.

2. The control system (54) of claim 1, wherein the one or more processors (84) execute instructions to:
   determine a variable inceptor command deadzone (VICD) (96), wherein the VICD (96) is one of the one or more command modifiers; and
   apply the (VICD) (96) to an input of a command model (88).

3. The control system (54) of claim 2, wherein the one or more processors (84) determine the VICD (96) by executing instructions to:
   determine the one or more zero-force detent rates (D) is above a predetermined threshold (114) of the zero-force detent rates (D);
   calculate a VICD size (E) based on the one or more zero-force detent rates (D) above the predetermined threshold (114) of the zero-force detent rates (D); and
   smooth the VICD (96) by applying one or more of low-pass filtering and time delays to the VICD (96); and
   reduce or substantially eliminate rapid changes in the VICD size (E) as the one or more zero-force detent rates (D) return below the predetermined threshold (114) of the zero-force detent rates (D).

4. The control system (54) of claim 2, wherein a force feel profile (79) is linear within a detent width (97) and a detent force gradient (80) decreases outside the detent width (97).

5. The control system (54) of claim 2, further comprising:
   apply a detent rate limiter (DRL) (100) to the one or more zero-force detent rates (D), wherein the DRL (100) is one of the one or more command modifiers.

6. The control system (54) of claim 5, wherein the one or more zero-force detent rates (D) is a commanded rate of movement of a zero-force detent (51) of the one or more active inceptors (14), and wherein the one or more processors (84) executes instructions to:
   calculate the one or more zero-force detent rates (D) from an off-axis detent rate command from decoupling (108) and machine states to the one or more active inceptors (14); and
   compute an overall detent rate in an on-axis direction by using off-axis operator control inputs in combination with a current machine state (33) as input.

7. The control system (54) of claim 5, wherein the one or more zero-force detent rates (D) is a function of a current machine state (33) and the first direction of the operator control input (62) to the one or more active inceptors (14).

8. The control system (54) of claim 5, wherein the one or more processors (84) determine a variable asymmetric breakout force (VABF) (98) that is one of the one or more command modifiers by executing instructions to:
   modify a force feel profile (79) generated by a force feel generator (122) operably connected to the one or more active inceptors (14) by:
   adjust a breakout force $F_{BO}$ generated by the force feel generator (122) of the one or more active inceptors (14) along a detent force gradient (80) proportional to the one or more zero-force detent rates (D).

9. The control system (54) of claim 8, wherein the one or more processors (84) adjust the breakout force $F_{BO}$ by executing instructions to:
   modify a breakout force $F_{BO}$ position to follow VICD (96) boundaries (116); and
   set the breakout force $F_{BO}$ as proportional to the one or more zero-force detent rates (D).

10. The control system (54) of claim 8, further comprising one or more inline actuators (32) operably connected to the one or more active inceptors (14) of the VOI (55), wherein the one or more processors (84) adjust the breakout force $F_{BO}$ by executing instructions to:
   increase the breakout force $F_{BO}$ when a direction of the operator control input (62) is opposite to a direction of the one or more zero-force detent rates (D) as determined by the OID (94), and wherein the DRL (100) applies a rate limit to a commanded zero-force detent (51), and wherein the one or more processors (84) reduce or substantially eliminate movement of the machine (10) by executing instructions to reduce or substantially eliminate movement of the machine (10) via one or more control effector devices (18) and the one or more inline actuators (32).

11. The control system (54) of claim 1, further comprising one or more inline actuators (32) operably connected to the one or more active inceptors (14) of the VOI (55), wherein the one or more processors (84) executes instructions to:
   detect the operator control input (62) to the one or more active inceptors (14) through the OID (94), wherein the control system (54) reduces or substantially eliminates movement of the machine (10) by controlling movement of the one or more inline actuators (32).

12. A method for limiting operator control input (62) in a machine (10), wherein the machine (10) includes a control system (54) having a variable operator interface (VOI) (55), the method comprising:
   detecting, by a control module (20), an existence and a first direction of the operator control input (62) to one or more active inceptors (14) being backdriven from an operator on inceptor detector (OID) (94);
   comparing the first direction of the operator control input (62) with a second direction of one or more zero-force detent rates (D) to determine a variance;

interpreting the operator control input (62) as inadvertent based on the variance between the first direction and the second direction; and in response to interpreting the operator control input (62) as inadvertent, limiting the operator control input (62) to reduce or substantially eliminate movement of the machine (10) caused by inadvertent input by modifying the operator control input (62) based on one or more command modifiers.

13. The method of claim 12, wherein the method further comprises:

determining a variable inceptor command deadzone (VICD) (96), wherein the VICD (96) is one of the one or more command modifiers; and applying the (VICD) (96) to an input of a command model (88).

14. The method of claim 13, wherein the method further comprises:

determining the one or more zero-force detent rates (D) is above a predetermined threshold (114) of the zero-force detent rates (D);

calculating a VICD size (E) based on the one or more zero-force detent rates (D) above the predetermined threshold (114) of the zero-force detent rates (D);

smoothening the VICD (96) by applying one or more of low-pass filtering and time delays to the VICD (96); and reducing or substantially eliminating rapid changes in the VICD size (E) as the one or more zero-force detent rates (D) returns below the predetermined threshold (114) of the zero-force detent rates (D).

15. The method of claim 13, wherein a force feel profile (79) is linear within a detent width (97), and wherein a detent force gradient (80) decreases outside the detent width (97).

16. The method of claim 13, further comprising:

applying a detent rate limiter (DRL) (100) to the one or more zero-force detent rates (D), wherein the DRL (100) is one of the one or more command modifiers.

17. The method of claim 16, further comprising:

calculating the one or more zero-force detent rates (D) from an off-axis detent rate command from decoupling (108) and machine states to the one or more active inceptors (14), wherein the one or more zero-force detent rates (D) is a commanded rate of movement of a zero-force detent (51) of the one or more active inceptors (14); and computing an overall detent rate in an on-axis direction by using off-axis operator control inputs in combination with a current machine state (33) as input.

18. The method of claim 16, wherein the method further comprises determining a variable asymmetric breakout force (VABF) (98) that is one of the one or more command modifiers by:

modifying a force feel profile (79) generated by a force feel generator (122) operably connected to the one or more active inceptors (14) by:

adjusting a breakout force $F_{BO}$ generated by the force feel generator (122) of the one or more active inceptors (14) along a detent force gradient (80) proportional to zero-force detent rate (D).

19. The method of claim 18, wherein the method further comprises adjusting the breakout force $F_{BO}$ by:

modifying a breakout force $F_{BO}$ position to follow VICD (96) boundaries (116); and setting the breakout force $F_{BO}$ as proportional to the one or more zero-force detent rates (D).

20. The method of claim 18, wherein the method further comprises adjusting the breakout force $F_{BO}$ by:

increasing the breakout force $F_{BO}$ when a direction of the operator control input (62) is opposite to a direction of the one or more zero-force detent rates (D) as determined by the OID (94); and applying a rate limit, by the DRL (100), to a commanded zero-force detent (51), wherein the movement of the machine (10) is reduced or substantially eliminated by one or more control effector devices (18) and one or more inline actuators (32).

\* \* \* \* \*